United States Patent
Zhong et al.

(10) Patent No.: US 7,448,644 B2
(45) Date of Patent: Nov. 11, 2008

(54) SANDWICHED TUBULAR AIRBAGS (75) Inventors: Zhihua Zhong, Changsha (CN); Wen He, Changsha (CN)

(73) Assignee: Hunan University State Key Laboratory of Advanced Design and Manufacture for Vehicle Body, Hunan Province (CN)

( * ) Notice: Subject to any disclaimer, the term of this patent is extended or adjusted under 35 U.S.C. 154(b) by 0 days.

(21) Appl. No.: 11/807,593

(22) Filed: May 29, 2007

(65) Prior Publication Data
US 2007/0252367 A1 Nov. 1, 2007

Related U.S. Application Data

(63) Continuation of application No. PCT/CN2004/001416, filed on Dec. 6, 2004.

(30) Foreign Application Priority Data
Nov. 30, 2004 (CN) .......................... 2004 1 0046990

(51) Int. Cl.
*B60R 21/16* (2006.01)
(52) U.S. Cl. .................................. 280/729; 280/743.1
(58) Field of Classification Search .............. 280/728.1, 280/729, 730.2, 743.1, 743.2
See application file for complete search history.

(56) References Cited

U.S. PATENT DOCUMENTS

| 3,784,225 A | * | 1/1974 | Fleck et al. ................ 280/729 |
| 3,788,663 A | * | 1/1974 | Weman ..................... 280/729 |
| 3,792,873 A | * | 2/1974 | Buchner et al. .......... 280/743.1 |
| 3,960,386 A | * | 6/1976 | Wallsten .................... 280/731 |
| 3,970,328 A | * | 7/1976 | Wallsten .................... 280/731 |
| 4,076,277 A | * | 2/1978 | Kuwakado et al. .......... 280/738 |
| 5,372,381 A | * | 12/1994 | Herridge ................. 280/743.1 |

(Continued)

FOREIGN PATENT DOCUMENTS

CN    1255899    6/2000

(Continued)

OTHER PUBLICATIONS

International Search Report corresponding to International Application No. PCT/CN2004/001416, mailed Jul. 21, 2005.

*Primary Examiner*—Kevin Hurley
*Assistant Examiner*—Barry Gooden, Jr.
(74) *Attorney, Agent, or Firm*—Hanley, Flight & Zimmerman, LLC (57) ABSTRACT

Sandwiched tubular safety airbags are disclosed. An example sandwiched tubular safety airbag comprises an air tube truss (2) formed by a bending hollow air tube (21), a lower air cushion (4) and an upper air cushion (1). The lower air cushion (4) is provided at the bottom of the air tube truss (2), and the upper air cushion (1) is provided on top of the air tube truss (2). An inlet opening (5) is provided on the bottom surface of the lower air cushion (4). The end openings of the hollow air tube (21) of the air tube truss (2) are charging openings (3) of the air tube truss (2). Charging holes (11) are provided at joints of the lower air cushion (4) with the charging openings (3) of the air tube truss (2). The top of the air tube truss (2) is provided with one or more discharging holes (6) communicating with the upper air cushion (1).

11 Claims, 6 Drawing Sheets

U.S. PATENT DOCUMENTS

| | | | | |
|---|---|---|---|---|
| 5,447,326 | A * | 9/1995 | Laske et al. | 280/728.3 |
| 5,464,250 | A * | 11/1995 | Sato | 280/743.1 |
| 5,730,464 | A * | 3/1998 | Hill | 280/743.2 |
| 5,791,685 | A * | 8/1998 | Lachat et al. | 280/743.1 |
| 5,924,721 | A * | 7/1999 | Nakamura et al. | 280/730.2 |
| 6,010,149 | A * | 1/2000 | Riedel et al. | 280/730.2 |
| 6,059,310 | A * | 5/2000 | Buss | 280/729 |
| 6,116,644 | A * | 9/2000 | Viano et al. | 280/743.1 |
| 6,267,408 | B1 | 7/2001 | Jarboe et al. | |
| 6,302,431 | B1 * | 10/2001 | Sasaki et al. | 280/728.2 |
| 6,364,348 | B1 * | 4/2002 | Jang et al. | 280/730.2 |
| 6,478,329 | B1 * | 11/2002 | Yokoyama | 280/729 |
| 6,695,342 | B2 * | 2/2004 | Tanase et al. | 280/730.2 |
| 6,702,320 | B1 * | 3/2004 | Lang et al. | 280/729 |
| 6,827,368 | B2 * | 12/2004 | Jang et al. | 280/729 |
| 6,976,702 | B2 * | 12/2005 | Yokota et al. | 280/730.2 |
| 6,991,257 | B2 * | 1/2006 | Zhao et al. | 280/730.2 |
| 7,052,042 | B2 * | 5/2006 | Sato et al. | 280/743.1 |
| 7,188,862 | B2 * | 3/2007 | Webber | 280/729 |
| 2002/0043791 | A1 * | 4/2002 | Barnes | 280/743.1 |
| 2002/0084633 | A1 * | 7/2002 | Heigl et al. | 280/730.2 |
| 2003/0034637 | A1 * | 2/2003 | Wang et al. | 280/729 |
| 2003/0184060 | A1 * | 10/2003 | Smith et al. | 280/730.2 |
| 2004/0130127 | A1 * | 7/2004 | Kurimoto et al. | 280/729 |
| 2004/0174003 | A1 * | 9/2004 | Dominissini | 280/729 |
| 2005/0082797 | A1 * | 4/2005 | Welford et al. | 280/730.2 |
| 2005/0110257 | A1 * | 5/2005 | Cohen | 280/743.1 |
| 2005/0206143 | A1 * | 9/2005 | Webber | 280/736 |
| 2005/0206147 | A1 * | 9/2005 | Sievers | 280/743.1 |
| 2006/0163849 | A1 * | 7/2006 | Keshavaraj | 280/730.2 |
| 2007/0252367 | A1 * | 11/2007 | Zhong et al. | 280/729 |

FOREIGN PATENT DOCUMENTS

| | | |
|---|---|---|
| CN | 2536116 Y | 2/2003 |
| GB | 1 500 967 | 2/1978 |
| JP | 08-268213 | 10/1996 |

* cited by examiner

SANDWICHED TUBULAR AIRBAGS

RELATED APPLICATION

This patent is a continuation of International Patent Application Serial No. PCT/CN2004/001416, which was filed on Dec. 6, 2004 and which is hereby incorporated by reference in its entirety.

FIELD OF THE DISCLOSURE

The present disclosure relates generally to safety protection devices, and more specifically to improved structures for safety airbags for use in vehicles to protect occupants during collisions and/or the like.

BACKGROUND

Recently, the safety airbag system has found wider and wider application as a constraining device in vehicles to protect the heads of vehicle occupants during an accident such as a collision. All currently available safety airbags employ airbags that can be charged to form a soft air cushion, so as to buffer and absorb energy and hence reduce injuries to occupants. In case of a collision where it is necessary to activate a safety airbag, the airbag is charged with a large amount of gas generated by a gas generator and deployed in the form of a soft protection layer so as to buffer the collision impact onto the occupant's body. During the operation of the safety airbag, the gas generated by the gas generator quickly charges the airbag. It is an instantaneous expansion procedure, and hence the manner in which the airbag is deployed has significant influences on the airbag performance. The change of gas pressure and the final pressure value within the airbag also have significant influences on the degree of the protection that is provided to the occupant's body. In general, the conventional airbag is charged first, and is then deployed after being released. Since the charging speed is very quick, the great impact force generated in the forward direction when the airbag begins to expand will probably cause injury to the occupant's body; particularly in the case where the occupant's body is close to the airbag. In such circumstances, the great impact force can easily result in injury to the chest of an occupant who is very close to the airbag and moving against the expansion direction of the airbag. Furthermore, for the purpose of providing good protection, the volume of an airbag should not be too small. In general, the airbag at the driver's side is typically 30-60 L in volume, while the airbag at the passenger's side generally requires a volume of about 60-150 L. Thus, there are major requirements on the charging amount and the charging speed in order for air bags to be quickly and fully charged with gas and to be completely deployed in a short time.

Reference numbers in the drawings are as follows:
1—an upper air cushion
2—an air tube truss
3—a charging opening
4—a lower air cushion
5—an inlet opening
6—a discharging hole
7—a pulling belt
8—an upper fixing disc
9—a lower fixing disc
10—a tube pulling belt
11—a charging hole
21—a hollow air tube

DETAILED DESCRIPTION

Figure 1:
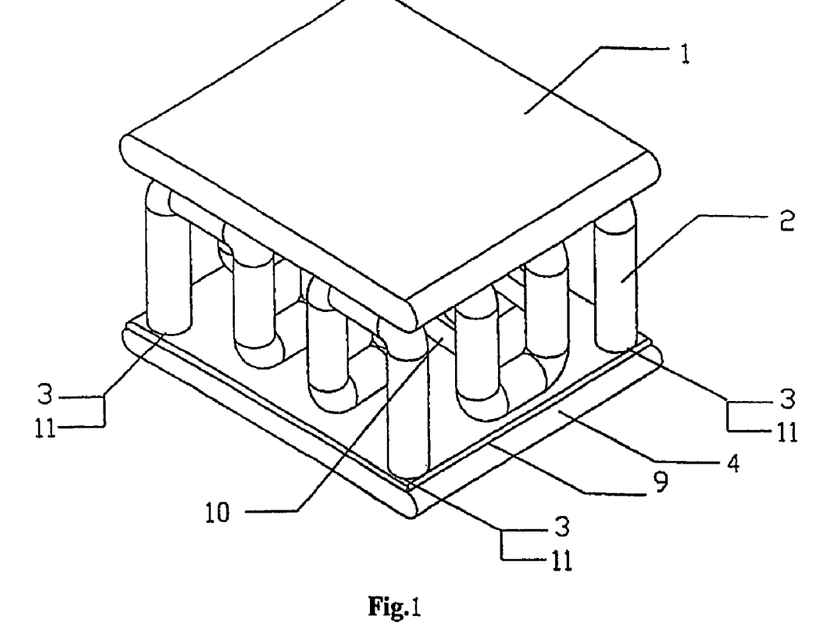
FIG. 1 is a schematic perspective view of an example structure constructed in accordance with the teachings of the invention wherein the air tube truss is of a rectangular shape.
Figure 2:
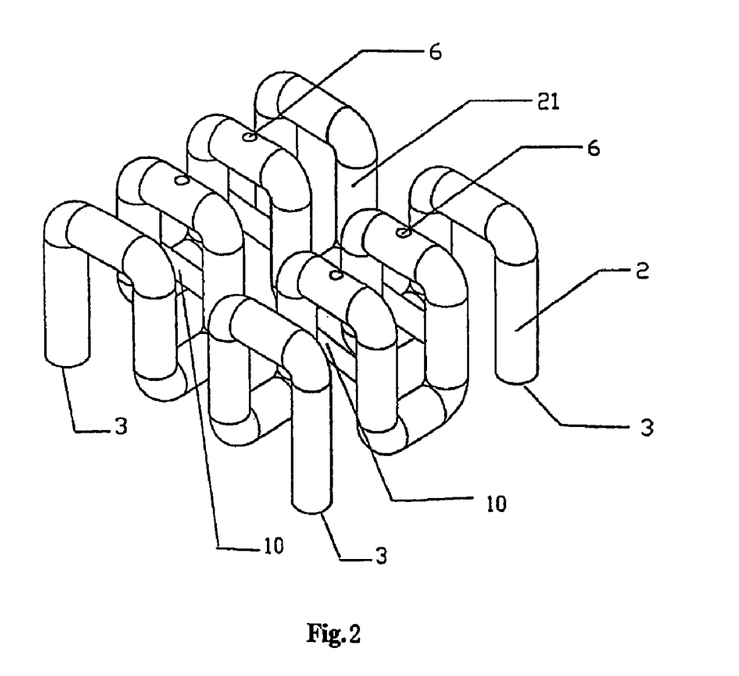
FIG. 2 is a schematic perspective view of the structure of an example rectangular-shaped air tube truss.
Figure 3:
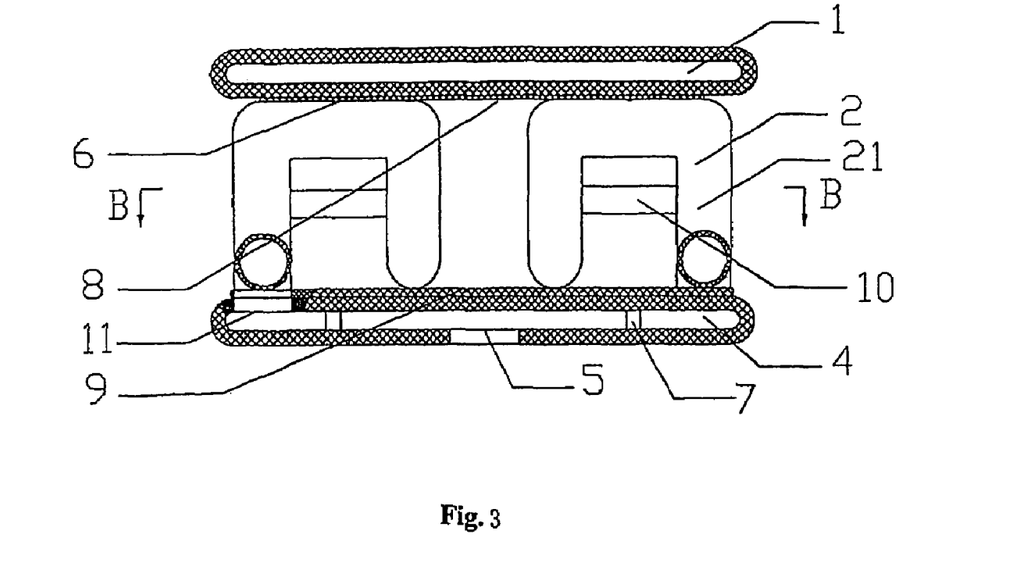
FIG. 3 is a schematic sectional view of the example structure of FIG. 1 wherein the air tube truss is of a rectangular shape.
Figure 4:
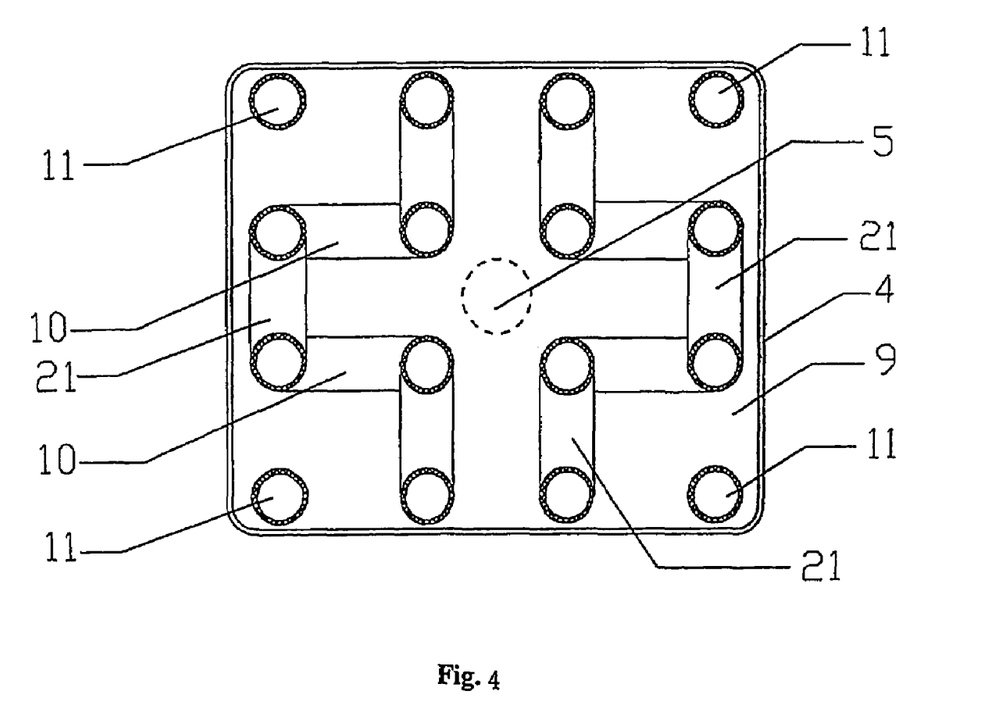
FIG. 4 is a sectional view taken along the line B-B in FIG. 3.
Figure 5:
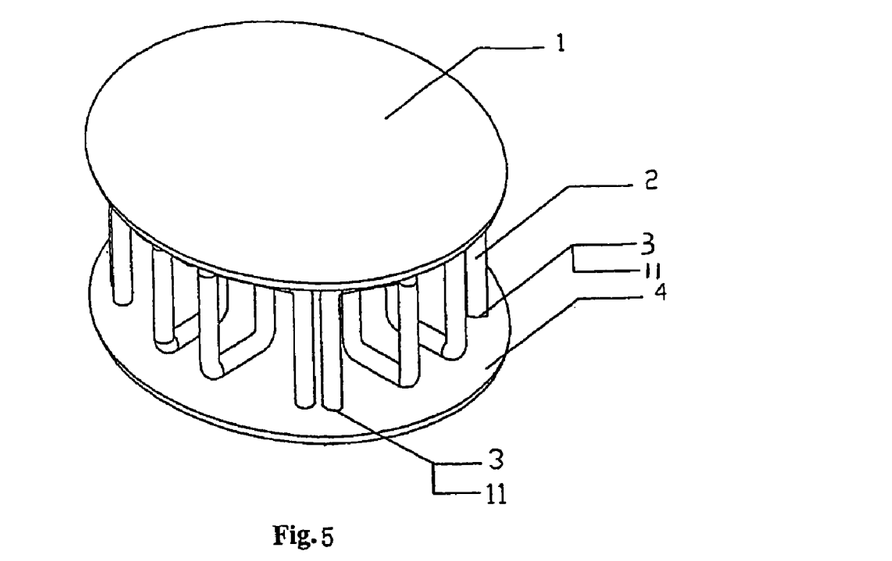
FIG. 5 is a schematic perspective view of another example structure constructed in accordance with the teachings of the invention wherein the air tube truss is of an oval shape.
Figure 6:
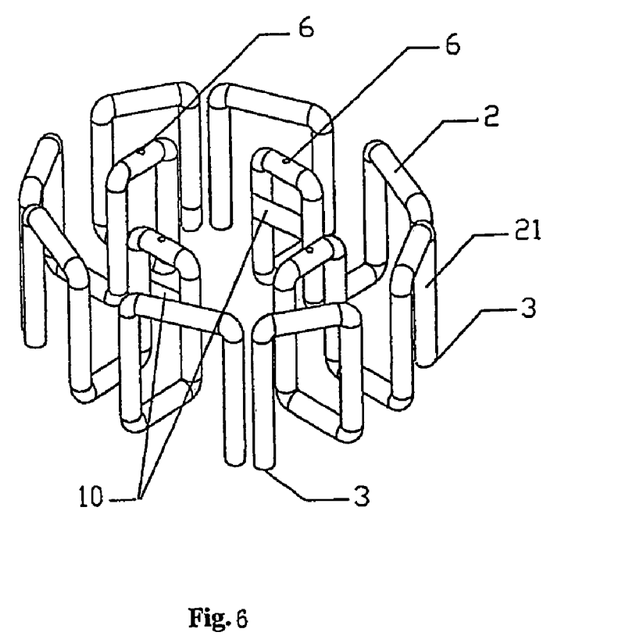
FIG. 6 is a schematic perspective view of the structure of an example oval-shaped air tube truss constructed in accordance with the teachings of the invention.
Figure 7:
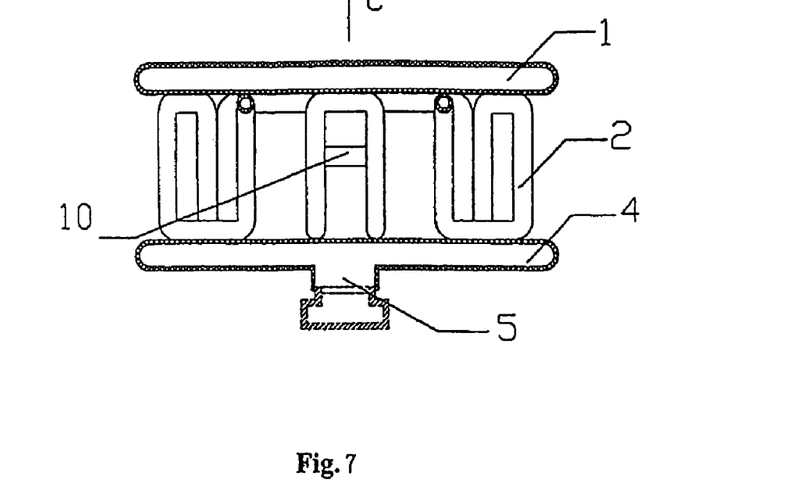
FIG. 7 is a schematic sectional view of the example structure of FIG. 5 wherein the air tube truss is of an oval shape.
Figure 8:
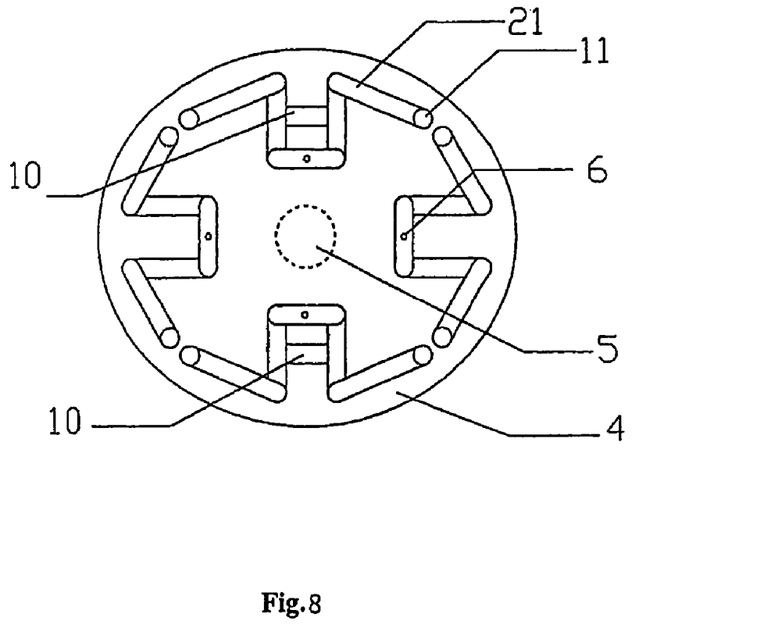
FIG. 8 is a cross-sectional view seen in the direction C of FIG. 7 with the upper air cushion removed.
Figure 9:
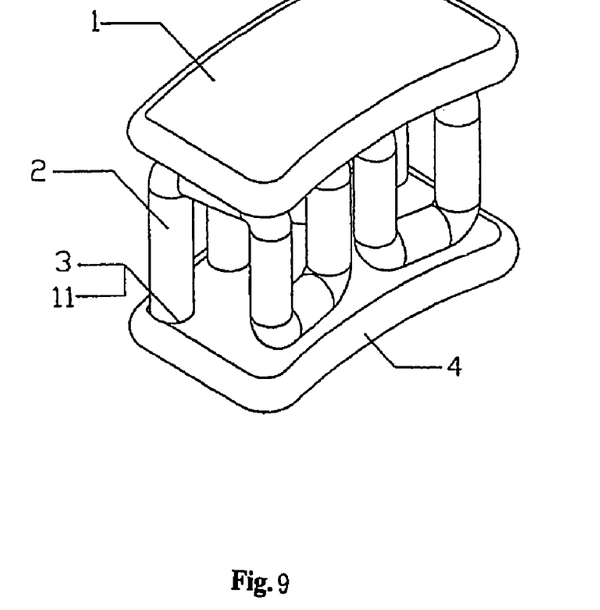
FIG. 9 is a schematic perspective view of an example structure constructed in accordance with the teachings of the invention wherein the air tube truss is of an arc shape.
Figure 10:
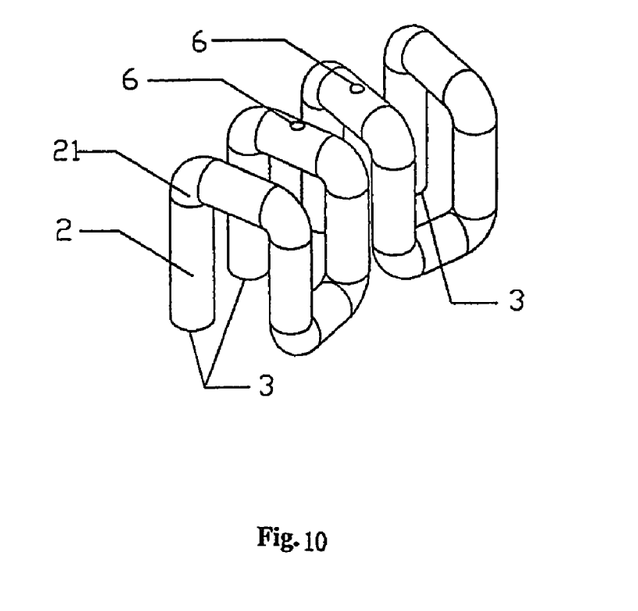
FIG. 10 is a schematic perspective view of the structure of an example arc-shaped air tube truss constructed in accordance with the teachings of the invention.
Figure 11:
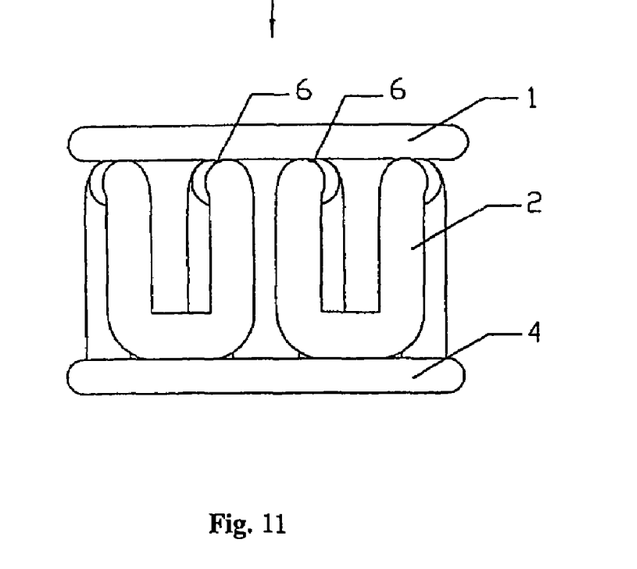
FIG. 11 is a schematic sectional view of the example structure of FIG. 9 wherein the air tube truss is of an arc shape.
Figure 12:
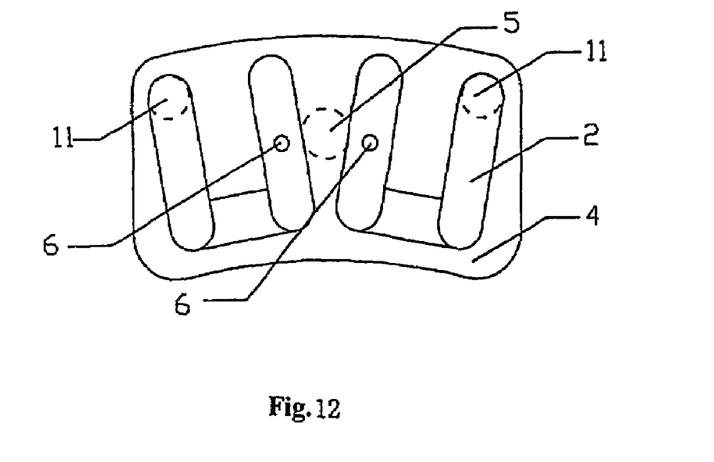
FIG. 12 is a cross sectional view seen in the direction A of FIG. 11 with the upper air cushion removed.

As shown in FIG. 1 through FIG. 12, example sandwiched tubular airbags constructed in accordance with the teachings of the invention comprise an air tube truss 2 formed by one or more bending hollow air tubes 21, a lower air cushion 4 and an upper air cushion 1. The lower air cushion 4 is provided at the bottom of the air tube truss 2, and the upper air cushion 1 is provided at the top of the air tube truss 2. An inlet opening 5 (see, for example, FIG. 3) is provided on the bottom surface of the lower air cushion 4. The end openings of the hollow air tubes 21 constituting the air tube truss 2 function as charging openings 3 for the air tube truss 2. One or more charging holes 11 (see, for example, FIG. 4) are provided at joints of the lower air cushion 4 with the charging openings 3 of the air tube truss 2. The top of the air tube truss 2 is provided with one or more discharging holes 6 (see, for example, FIG. 2) which communicate with the upper air cushion 1. Seaming connections are applied between the upper air cushion 1 and the air tube truss 2 and between the lower air cushion 4 and the air tube truss 2. An upper fixing disc 8 may be arranged between the top of the air tube truss 2 and the upper air cushion 1. A lower fixing disc 9 may be arranged between the bottom of the air tube truss 2 and the lower air cushion 4. Seaming connections are applied between the top of the air tube truss 2 and the upper fixing disc 8, between the bottom of the air tube truss 2 and the lower fixing disc 9, between the upper fixing disc 8 and the upper air cushion 1, and between the lower fixing disc 9 and the lower air cushion 4. For example, the materials forming the air cushions 1, 4 can be fused into seams with the materials forming the fixing discs 8, 9, the materials forming the fixing discs 8, 9 can be fused into seams with the material forming the truss 2, and/or an adhesive fastener such as a glue can be used to secure the truss 2, the fixing discs 8, 9 and/or the upper and lower air cushions 1, 4. The number of hollow air tubes 21 used to form the truss 2 may be one or more. The air tube truss 2 may be arranged in any desired shape such as a circular shape, an oval shape, a rectangular shape, an arc shape or a polygonal shape. The upper air cushion 1 and lower air cushion 4 may also be in any desired shape such as circular shapes, oval shapes, rectangular shapes, arc shapes or polygonal shapes. The upper air cushion 1 and the lower air cushion 4 may be provided with a pulling belt 7, or the air tube truss 2 may be provided with a tube pulling belt 10 to maintain the shapes of these structures when inflated. Alternatively, the upper air cushion 1 and the lower air cushion 4 may be provided with a pulling belt 7 and the air tube truss 2 may be provided with a tube pulling belt 10.

FIGS. 1 to 4 show an example in which the air tube truss 2 is arranged in a rectangular shape. In this example, the air tube truss 2 is formed by bending two hollow air tubes 21 into rectangular, corkscrew-like shapes, the lower air cushion 4 is provided at the bottom of the air tube truss 2, and the upper air cushion 1 is provided on the top of the air tube truss 2. An upper fixing disc 8 is arranged between the top of the air tube truss 2 and the upper air cushion 1. A lower fixing disc 9 is arranged between the bottom of the air tube truss 2 and the lower air cushion 4. Seaming connections are applied between the top of the air tube truss 2 and the upper fixing disc 8, between the bottom of the air tube truss 2 and the lower fixing disc 9, between the upper fixing disc 8 and the upper air cushion 1, and between the lower fixing disc 9 and the lower air cushion 4. An inlet opening 5 is provided on the bottom surface of the lower air cushion 4. Four charging holes 11 are provided at the joints of the lower air cushion 4 with the charging openings 3 of the air tube truss 2. The top of the air tube truss 2 is provided with four discharging holes 6 which communicate with the upper air cushion 1. The upper and lower air cushions 1, 4 are also in rectangular shapes. Pulling belts 7 are provided on the upper air cushion 1, and tube pulling belts 10 are provided on the air tube truss 2.

FIGS. 5 to 8 show a second example air bag. In this example, the air tube truss 2, (formed by bending four hollow air tubes 21), is arranged in an oval shape. The lower air cushion 4 is provided at the bottom of the air tube truss 2, and the upper air cushion 1 is provided on the top of the air tube truss 2. Seaming connections are applied between the upper air cushions 1 and the air tube truss 2 and between the lower air cushions 4 and the air tube truss 2. An inlet opening 5 is provided on the bottom surface of the lower air cushion 4. Eight charging holes 11 are provided at the joints of the lower air cushion 4 with the charging openings 3 of the air tube truss 2. The top of the air tube truss 2 is provided with four discharging holes 6 which communicate with the upper air cushion 1. The upper and lower air cushions 1, 4 are also in oval shapes. Tube pulling belts 10 are provided on the air tube truss 2. No fixing discs are employed in this example, but they could be added, if desired.

FIGS. 9 to 12 show a third example air bag. In this example, the air tube truss 2, (formed by bending two hollow air tubes 21), is arranged in an arc shape. The lower air cushion 4 is provided at the bottom of the air tube truss 2, and the upper air cushion 1 is provided on the top of the air tube truss 2. Seaming connections are applied between the upper air cushions 1 and the air tube truss 2 and between the lower air cushions 4 and the air tube truss 2. An inlet opening 5 is provided on the bottom surface of the lower air cushion 4. Four charging holes 11 are provided at the joints of the lower air cushion 4 with the charging openings 3 of the air tube truss 2. The top of the air tube truss 2 is provided with two discharging holes 6 which communicate with the upper air cushion 1. The upper and lower air cushions 1, 4 are also in arc shapes.

The working principles of the illustrated example lie in the fact that the gas generated by a gas generator enters the lower air cushion 4 through the inlet opening 5, then enters the air tube truss 2 through the charging openings 3, and finally enters the upper air cushion 1 through the discharging holes 6 so as to form a soft protection layer of low gas pressure between the high-pressure air tube truss 2 and the occupants in vehicles. The illustrated example airbags may be arranged in motor vehicles and can provide efficient protection to the occupants in case of collisions.

From the foregoing, persons of ordinary skill in the art will appreciate that the illustrated examples provide sandwiched tubular airbags, which are readily manufactured and need less gas. The proposed airbags can effectively control the charging direction of gas streams, and, thus, can be deployed quickly and effectively in a predetermined direction. Furthermore, the impact forces onto the occupants' bodies during airbag expansions are small. Therefore, injuries on the bodies, especially on the displaced bodies due to airbag expansions, can be significantly reduced. Hence the protection performance of the disclosed safety airbag devices is enhanced relative to the prior art.

The above technical problems are solved in the illustrated examples by employing a sandwiched tubular safety airbag, comprising an air tube truss including one or more bending hollow air tube(s), a lower air cushion and an upper air cushion, the lower air cushion is provided at the bottom of the air tube truss, the upper air cushion is provided on top of the air tube truss, the lower air cushion communicates with the air tube truss and the air tube truss communicates with the upper air cushion, such that a gas successively enters from the lower air cushion into the air tube truss and the upper air cushion.

As a further modification, an upper fixing disc may be provided between the air tube truss and the upper air cushion, and/or a lower fixing disc may be provided between the air tube truss and the lower air cushion.

As a further modification, seaming connections are applied between the upper air cushion and the air tube truss and between the lower air cushion and the air tube truss. Seaming connections may also be applied between the air tube truss and the upper fixing disc, between the air tube truss and the lower fixing disc, between the upper fixing disc and the upper air cushion, and between the lower fixing disc and the lower air cushion.

As a further modification, the hollow air tube comprises two or more hollow air tubes.

As a further modification, the air tube truss may be arranged in at least one of a circular shape, an oval shape, a rectangular shape, or a polygonal shape. The upper air cushion and the lower air cushion may also be constructed in at least one of circular shapes, oval shapes, rectangular shapes, or polygonal shapes.

As a further modification, at least one of the upper air cushion and the lower air cushion is provided with a pulling belt, and/or the air tube truss is provided with a tube pulling belt.

As a further modification, an inlet opening is provided on a bottom surface of the lower air cushion.

As a further modification, end openings of the hollow air tube of the air tube truss comprise charging openings for the air tube truss, charging holes are provided at joints between the lower air cushion and the charging openings of the air tube truss.

As a further modification, a top of the air tube truss is provided with one or more discharging holes communicating with the upper air cushion.

As a further modification, the charging openings of the air tube truss are arranged on a circumference of the lower air cushion.

A disclosed sandwiched tubular safety airbag comprises an air tube truss formed by bending a hollow air tube, and air cushions provided above and below the air tube truss. The amount of gas required by the structure of the tubular air tube truss is considerably reduced as compared to that required to charge a conventional air bag, such that the charging effect of conventional airbags can be achieved with relatively less gas. Furthermore, the air tube truss and the upper air cushion that protects the bodies have two different rigidities, with the rigidity of the upper buffering air cushion for coming into contact with the bodies being lower. In this way, the impact force acting upon the bodies during airbag expansion is a buffering impact of low pressure gas in the examples disclosed herein in contrast to an otherwise instantaneous impact from high pressure gas experienced with a conventional airbag. In addition, the air tube truss is formed by a bending hollow air tube. Therefore, it needs much less gas, can effectively control the charging direction of gas streams, and, thus, can be deployed quickly and effectively according to a predetermined orientation. Therefore, injuries upon bodies during airbag expansions are greatly reduced, and the protection performance of the safety airbag device is enhanced relative to conventional airbags. In this way, injuries to the occupants of vehicles due to one or more collisions are effectively decreased, and/or a secondary collision may be avoided. In some examples, the charging openings of the air tube truss are provided on the circumference of the lower air cushion such that the air tube is charged in a manner from outside to inside. In some examples, the air cushion may be arranged in an arc shape. These can provide better injury avoidance to displaced occupants. Since the air tube truss is formed by bending a hollow air tube, it has good manufacturability and is easy to be formed in one single process. The air tube truss can also be easily made into various shapes.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A sandwiched tubular safety airbag, comprising an air tube truss including at least one bending hollow air tube, a lower air cushion and an upper air cushion, wherein the lower air cushion is provided at the bottom of the air tube truss, the upper air cushion is provided on top of the air tube truss, the lower air cushion communicates with the air tube truss and the air tube truss communicates with the upper air cushion, such that a gas successively enters from the lower air cushion into the air tube truss and the upper air cushion, wherein the hollow air tube comprises two or more hollow air tubes.

2. The sandwiched tubular safety airbag according to claim 1, wherein seaming connections are applied between the upper air cushion and the air tube truss, and between the lower air cushion and the air tube truss.

3. The sandwiched tubular safety airbag according to claim 1, wherein an upper fixing disc is provided between the air tube truss and the upper air cushion, and a lower fixing disc is provided between the air tube truss and the lower air cushion.

4. The sandwiched tubular safety airbag according to claim 3, wherein seaming connections are applied between the air tube truss and the upper fixing disc, between the air tube truss and the lower fixing disc, between the upper fixing disc and the upper air cushion, and between the lower fixing disc and the lower air cushion.

5. The sandwiched tubular safety airbag according to claim 1, wherein the air tube truss is arranged in at least one of a circular shape, an oval shape, a rectangular shape, an arc shape, or a polygonal shape.

6. The sandwiched tubular safety airbag according to claim 5, wherein the upper air cushion and the lower air cushion are in at least one of circular shapes, oval shapes, rectangular shapes, arc shapes or polygonal shapes.

7. The sandwiched tubular safety airbag according to claim 6, wherein at least one of: (a) at least one of the upper air cushion and the lower air cushion is provided with a pulling belt, or (b) the air tube truss is provided with a tube pulling belt.

8. The sandwiched tubular safety airbag according to claim 1, wherein an inlet opening is provided on a bottom surface of the lower air cushion.

9. The sandwiched tubular safety airbag according to claim 1, wherein a top of the air tube truss is provided with one or more discharging holes communicating with the upper air cushion.

10. A sandwiched tubular safety airbag, comprising an air tube truss including at least one bending hollow air tube, a lower air cushion and an upper air cushion, wherein the lower air cushion is provided at the bottom of the air tube truss, the upper air cushion is provided on top of the air tube truss, the lower air cushion communicates with the air tube truss and the air tube truss communicates with the upper air cushion, such that a gas successively enters from the lower air cushion into the air tube truss and the upper air cushion, wherein end openings of the hollow air tube of the air tube truss comprise charging openings for the air tube truss, charging holes are provided at joints between the lower air cushion and the charging openings of the air tube truss.

11. The sandwiched tubular safety airbag according to claim 10, wherein the charging openings of the air tube truss are arranged at a periphery portion of an upper surface of the lower air cushion.

* * * * *